US009077983B2

(12) United States Patent
Chung et al.

(10) Patent No.: US 9,077,983 B2
(45) Date of Patent: Jul. 7, 2015

(54) DECODER, PROJECTING SYSTEM, AND METHOD FOR PROCESSING IMAGE THEREOF

(75) Inventors: Yau Wing Chung, New Taipei (TW); Yi-Chun Lu, New Taipei (TW)

(73) Assignee: Optoma Corporation, New Taipei (TW)

( * ) Notice: Subject to any disclaimer, the term of this patent is extended or adjusted under 35 U.S.C. 154(b) by 764 days.

(21) Appl. No.: 13/354,355

(22) Filed: Jan. 20, 2012

(65) Prior Publication Data

US 2012/0194640 A1    Aug. 2, 2012

(30) Foreign Application Priority Data

Jan. 31, 2011    (TW) .............................. 100103739 A

(51) Int. Cl.
*H04N 13/04* (2006.01)
(52) U.S. Cl.
CPC ....... *H04N 13/0438* (2013.01); *H04N 13/0459* (2013.01); *H04N 13/0497* (2013.01)
(58) Field of Classification Search
USPC ............ 353/7, 77, 88, 94; 348/42, 51, 52, 53, 348/55, 56; 352/62; 359/462, 466, 467; 349/15
See application file for complete search history.

(56) References Cited

U.S. PATENT DOCUMENTS

| | | | |
|---|---|---|---|
| 5,808,599 A * | 9/1998 | Allio ................................. 345/6 |
| 6,678,091 B2 * | 1/2004 | Tropper ......................... 359/462 |
| 6,687,399 B1 * | 2/2004 | Chuang et al. ................ 382/154 |
| 2001/0043266 A1 * | 11/2001 | Robinson et al. ............... 348/53 |
| 2009/0322861 A1 * | 12/2009 | Jacobs et al. .................... 348/53 |
| 2011/0134231 A1 * | 6/2011 | Hulvey et al. ................... 348/56 |
| 2011/0267441 A1 * | 11/2011 | Lee et al. ......................... 348/56 |
| 2013/0021436 A1 * | 1/2013 | Lu et al. .......................... 348/43 |

FOREIGN PATENT DOCUMENTS

TW            205426       5/1993

OTHER PUBLICATIONS

"The unique connection that enables DLP projectors to transmit 3D data—seamlessly" on Texas Instruments Official Website: http://www.dlp.com/projector/dlp-innovations/dlp-link.aspx, 1 page.

* cited by examiner

*Primary Examiner* — William C Dowling
(74) *Attorney, Agent, or Firm* — Jianq Chyun IP Office

(57) ABSTRACT

A decoder, a projecting system, and a method for processing an image thereof are provided. The decoder is adapted to the projecting system having a projecting module and a shutter glass. The decoder includes a decoding circuit and an indicating unit. The projecting module outputs a frame turning control signal to the shutter glass. The decoding circuit receives and decodes a three-dimensional (3D) video signal to produce a first image data and a second image data to the projecting module. The indicating unit is coupled to the decoding circuit and correspondingly produces an indicating signal when the decoding circuit outputs one of the first image data and the second image data.

17 Claims, 3 Drawing Sheets

DECODER, PROJECTING SYSTEM, AND METHOD FOR PROCESSING IMAGE THEREOF

CROSS-REFERENCE TO RELATED APPLICATION

This application claims the priority benefit of Taiwan application serial no. 100103739, filed Jan. 31, 2011. The entirety of the above-mentioned patent application is hereby incorporated by reference herein and made a part of this specification.

BACKGROUND OF THE INVENTION

1. Field of the Invention

The invention relates to a decoder, a projecting system, and a method for processing an image thereof. Moreover particularly, the invention relates to a decoder, a projecting system, and a method for processing an image thereof receiving a three-dimensional video signal.

2. Description of Related Art

Conventionally, when a left image and a right image are alternately displayed in a rapid and non-stop manner and an active shutter glass is turned on and off simultaneously, the left eye only sees the left image and the right eye only sees the right image so as to build a three-dimensional (3D) image for human eyes.

In the projection techniques of digital light processing link (DLP-Link), an image is inserted through an optical encode when turning from projecting a left eye image to a right eye image and vice versa. The shutter glass then detects the inserted image and turns the on/off state of a left eye shutter unit or a right eye shutter unit. For example, the left eye shutter unit in the on state and the right eye shutter unit in the off state are turned into the left eye shutter unit in the off state and the right eye shutter unit in the on state. However, the left eye shutter unit is turned on and the right eye shutter unit is turned off when the projector projects the right eye image, and the left eye shutter unit is turned off and the right eye shutter unit is turned off when the projector projects the left eye image, so that the user fails to see the correct 3D image.

A wireless microphone low battery indication device is disclosed in Taiwan Patent No. 205426. This device retrieves a low battery indication signal sent from a transmitter through a decoding circuit, controls a light emission of a light emitting diode, and generates an audio frequency from a buzzer, such that the user notices the transmitter to be in a low battery state.

SUMMARY OF THE INVENTION

The invention is directed to a decoder, a projecting system, and a method for processing an image thereof. The inconsistent sequence of projecting an image by a projecting module of a projecting system and turning on/off a shutter glass of the projecting system is solved through the disposition of an indicating unit of a decoder.

The advantages of the invention are further illustrated from the technical characteristics disclosed in the invention.

To attain one, a portion, or all objectives of the invention or other objectives, a decoder adapted for a projecting system is provided in one embodiment of the invention. The projecting system has a projecting module and a shutter glass. The projecting module outputs a frame turning control signal to the shutter glass. The decoder includes a decoding circuit and an indicating unit. The decoding circuit is configured to receive and decode a three-dimensional (3D) video signal to produce a first image data and a second image data and output the first image data and the second image data to the projecting module. The indicating unit is coupled to the decoding circuit and produces an indicating signal correspondingly when the decoding circuit outputs one of the first image data and the second image data.

To attain one, a portion, or all of the objectives aforementioned or other objectives, one embodiment of the invention further provides a projecting system including a decoder, a projecting module, and a shutter glass. The decoder includes a decoding circuit and an indicating unit. The decoding circuit is configured to receive and decode a 3D video signal to produce a first image data and a second image data. The indicating unit is coupled to the decoding circuit and produces an indicating signal correspondingly when the decoding circuit outputs one of the first image data and the second image data. The projecting module is coupled to the decoder and configured to receive the first image data and the second image data. The shutter glass is configured to receive a frame turning control signal output by the projecting module.

To attain one, a portion, or all of the objectives aforementioned or other objectives, one embodiment of the invention further provides a method for processing an image of a projecting system. The method includes the following. A 3D video signal is received and decoded to produce a first image data and a second image data. An indicating unit produces an indicating signal correspondingly according to one of the first image data and the second image data output by a decoding circuit.

In light of the foregoing, the embodiments mentioned above in the invention have at least one of the advantages listed below. In the embodiments of the invention, the indicating unit of the decoder may correspondingly produce the indicating signal according to one of the first image data and the second image data output by the decoding circuit of the decoder. Consequently, the user may determine whether a sequence for projecting a first projecting image and a second projecting image and a sequence for turning on a first shuttering unit and a second shuttering unit are corresponding to each other through the indicating unit and the shutter glass. In the embodiments of the invention, when the sequence for projecting the first projecting image and the second projecting image is not corresponding to the sequence for turning on the first shuttering unit and the second shuttering unit, the user may carry out some adjustments, so that the sequence for projecting the first projecting image and the second projecting image would correspond to the sequence for turning on the first shuttering unit and the second shuttering unit.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide further understanding, and are incorporated in and constitute a part of this specification. The drawings illustrate embodiments and, together with the description, serve to explain the principles of the invention.

DESCRIPTION OF EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
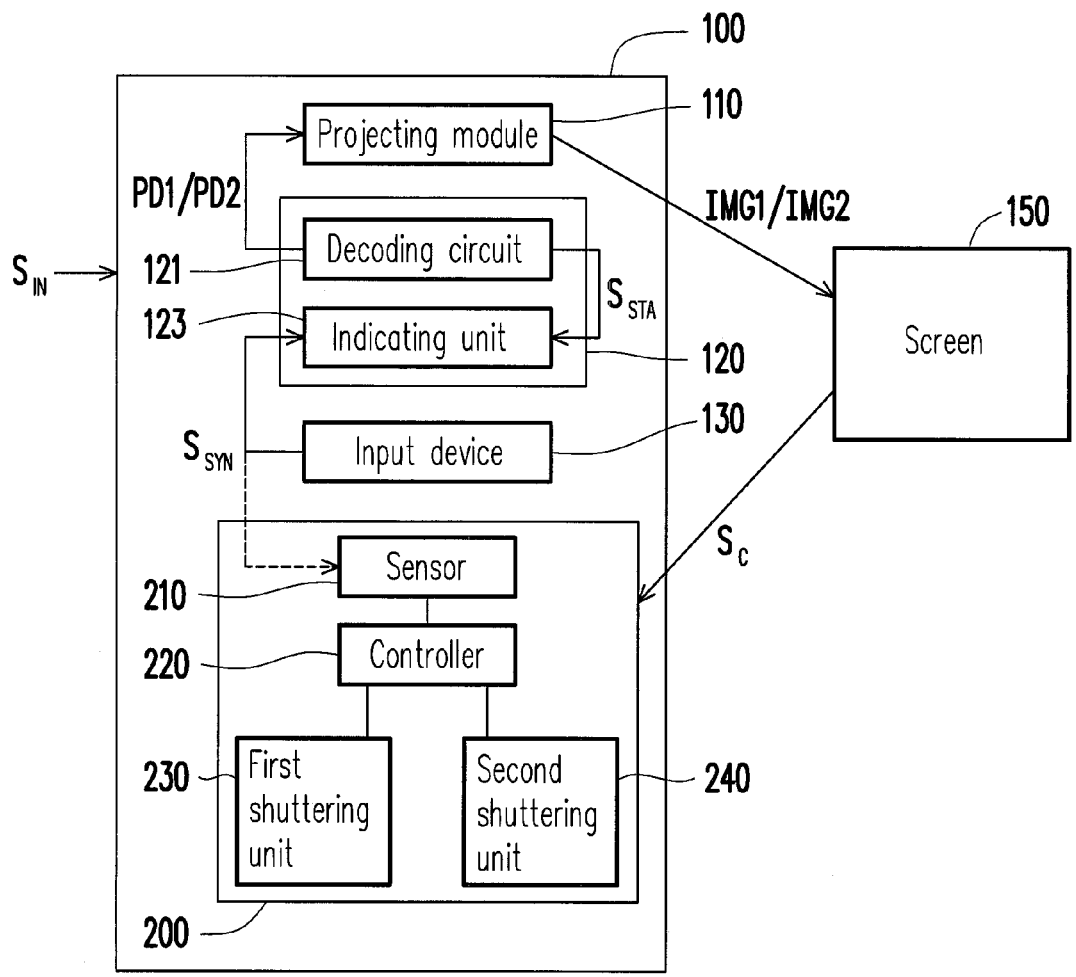
FIG. 1 illustrates a functional block diagram of a projecting system according to an embodiment of the invention.
Figure 2:
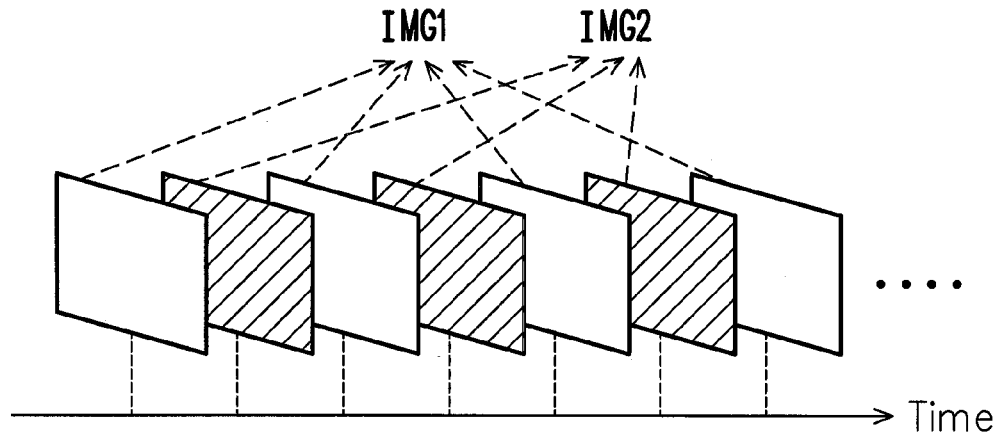
FIG. 2 shows a sequence of a plurality of three-dimensional projecting images in FIG. 1.

Referring to FIGS. 1 and 2, in the embodiment, a projecting system 100 is, for example, a digital light processing (DLP) projecting system capable of projecting a three-dimensional (3D) image. Herein, the 3D image is viewed by human eyes through an active shutter glass. The projecting system 100 receives a three-dimensional video signal (3D video signal for short in the following) $S_{IN}$ and includes a projecting module 110, a decoder 120, and a shutter glass 200. The decoder 120 includes a decoding circuit 121 and an indicating unit 123. The shutter glass 200 includes a sensor 210, a controller 220, a first shuttering unit 230, and a second shuttering unit 240. In the embodiment, the decoder 120 is external (whatever plug-in or wireless communication) from the projecting module 110 as an example. However, the invention is not limited thereto; that is, the decoder 120 may also be built-in in the projecting module 110.

In the embodiment, the 3D video signal $S_{IN}$ may satisfy the standard of version 1.4 of high definition multimedia interface (HDMI). Nevertheless, the invention is not limited thereto. For instance, the 3D video signal $S_{IN}$ may also satisfy the standard of version 1.2 of DisplayPort. Moreover, the 3D video signal $S_{IN}$ may also be a 3D video signal from a video source device (i.e. a Blu-ray player).

In the embodiment, the decoding circuit 121 of the decoder 120 decodes the received 3D video signal $S_{IN}$ to produce a first image data PD1 and a second image data PD2. Additionally, the decoding circuit 121 outputs the first image data PD1 and the second image data PD2 sequentially to the projecting module 110. Further, when the decoding circuit 121 outputs one of the first image data PD1 and the second image data PD2, an image status signal $S_{STA}$ is output correspondingly to the indicating unit 123, such that the indicating unit 123 correspondingly produces an indicating signal according to the received image status signal $S_{STA}$. That is, the indicating unit 123 indicates whether the first image data PD1 or the second image data PD2 is output by the decoding circuit 121. Herein, the indicating unit 123 includes a device having an indicating function, such as a light emitting device or a display device, to indicate whether the first image data PD1 or the second image data PD2 is output by the decoding circuit 121.

In the embodiment, the projecting module 110 projects a first projecting image IMG1 and a second projecting image IMG2 sequentially according to the first image data PD1 and the second image data PD2 received sequentially. The first projecting image IMG1 is produced by the projecting module 110 according to the first image data PD1, and one eye of the user (i.e. the left eye) sees the first projecting image IMG1 through the active shutter glass. The second projecting image IMG2 is produced by the projecting module 110 according to the second image data PD2, and other eye of the user (i.e. the right eye) sees the second projecting image IMG2 through the active shutter glass.

As depicted in FIG. 2, the first projecting image IMG1 and the second projecting image IMG2 are displayed alternately. That is, the first projecting image IMG1 and the second projecting image IMG2 are projected alternately on a screen 150. In the embodiment, the first projecting image IMG1 may be filtered by the second shuttering unit 240 of the shutter glass 200. Moreover, the second projecting image IMG2 may be filtered by the first shuttering unit 230 of the shutter glass 200. In other words, the first shuttering unit 230 and the second shuttering unit 240 may be configured to receive the first projecting image IMG1 and the second projecting image IMG2 respectively. Accordingly, the first projecting image IMG1 may pass through the first shuttering unit 230 and the second projecting image IMG2 may pass through the second shuttering unit 240. In the embodiment, the first shuttering unit 230 and the second shuttering unit 240 of the shutter glass 200 may respectively a left eye lens and a right eye lens of the active shutter glass (i.e. a liquid crystal shutter glass).

In the embodiment, the first shuttering unit 230 and the second shuttering unit 240 are controlled by a timing signal of the digital light processing link (i.e. a frame turning control signal $S_C$). Accordingly, the first shuttering unit 230 and the second shuttering unit 240 cover the eyes of the user alternately. The aforementioned alternating coverage is performed in substantial synchronization with a refresh rate of the screen. That is, the frequency of the alternating coverage is, for instance, 120 Hertz. In short, the image receiving operations of the first shuttering unit 230 and the second shuttering unit 240 are controlled by turning on or turning off the first shuttering unit 230 and the second shuttering unit 240 according to the frame turning control signal $S_C$, and the first shuttering unit and the second shuttering unit have contrary image receiving operations. At this time, a display (i.e. a projector) applies an alternate-frame sequencing technique to alternately display different frames corresponding to each eye, so that each eye sees the expected results of the predetermined images.

Referring to FIG. 1, the controller 220 is coupled to the sensor 210, the first shuttering unit 230, and the second shuttering unit 240. The sensor 210 of the projecting system 100 senses the frame turning control signal $S_C$ of the first projecting image IMG1 and the second projecting image IMG2 from the screen 150. In the embodiment, the frame turning control signal $S_C$ is a synchronous information of the digital light processing link (i.e. DLP-Link) hidden in the first projecting image IMG1 and the second projecting image IMG2. However, other embodiments are not limited thereto.

The controller 220 of the projecting system 100 turns on the first shuttering unit 230 and the second shuttering unit 240 alternately according to the frame turning control signal $S_C$ for the eyes of the user to view the first projecting image IMG1 and the second projecting image IMG2 alternately. Herein, when the first shuttering unit 230 is turned on, image beam may pass through the first shuttering unit 230. Similarly, when the second shuttering unit 240 is turned on, image beam may pass through the second shuttering unit 240.

Furthermore, when the shutter glass 200 receives the frame turning control signal $S_C$, the controller 220 turns the statuses of the first shuttering unit 230 and the second shuttering unit 240. It is assumed that the first shuttering unit 230 is turned on and the second shuttering unit 240 is turned off, the controller 220 may set the first shuttering unit 230 to be turned off and the second shuttering unit 240 to be turned on after the frame turning control signal $S_C$ is received, and then the controller 220 may set the first shuttering unit 230 to be turned on and the second shuttering unit 240 to be turned off after the frame turning control signal $S_C$ is received again. Accordingly, the first shuttering unit 230 is alternately set as turned on and off and the second shuttering unit 240 is also set alternately as turned on and off. Moreover, the sequences of turning on the first shuttering unit 230 and the second shuttering unit 240 are interlaced, and the operation of the alternation setting is generally performed in substantial synchronization with the refresh rate of the screen.

Accordingly, the left eye may see the first projecting image IMG1 through the first shuttering unit 230 being turned on and the right eye may see the second projecting image IMG2 through the second shuttering unit 240 being turned on. However, under some circumstances (i.e. the frame turning control signal $S_C$ is too weak and fails to be identified or the initiation of some of the devices are erroneous), the left eye may see the second projecting image IMG2 through the first shuttering unit 230 being turned on and the right eye may see the first projecting image IMG1 through the second shuttering unit being turned on. In other words, the sequence of turning on the first shuttering unit 230 and the second shuttering unit 240 may not be corresponding to the sequence of projecting the first projecting image IMG1 and the second projecting image IMG2 (which means the sequence of turning on the first shuttering unit 230 and the second shuttering unit 230 may not be corresponding to the sequence of outputting the first image data PD1 and the second image data PD2).

Accordingly, in the embodiment, the indicating signal produced by the indicating unit 123 is transmitted to the shutter glass 200 so as to indicate whether the image receiving operation of the first shuttering unit 230 or the image receiving operation of the second shuttering unit 240 is turned on/off. Specifically, the user then knows if the sequence of turning on the first shuttering unit 230 and the second shuttering unit 240 is corresponding to the sequence of projecting the first projecting image IMG1 and the second projecting image IMG2 or not through the indicating unit 123. In the embodiment, assuming the indicating unit is a light emitting device, the light emitting device then emits light when the first projecting image IMG1 is projected and remains dim when the second projecting image IMG2 is projected. The light emitting device is a light emitting diode (LED) or a light bulb. When the user covers the second shuttering unit 240 (or closes one of his/her eyes, for example) and the other eye sees the light emission of the first light emitting device through the first shuttering unit 230, the sequence of turning on the first shuttering unit 230 and the second shuttering unit 240 then corresponds to the sequence of projecting the first projecting image IMG1 and the second projecting image IMG2. When the user covers the second shuttering unit 240 (or closes one of his/her eyes, for example) and the other eye may not see the light emission of the first light emitting device through the first shuttering unit 230, the sequence of turning on the first shuttering unit 230 and the second shuttering unit 240 then does not correspond to the sequence of projecting the first projecting image IMG1 and the second projecting image IMG2.

Additionally, in other embodiments, the indicating unit 123 further includes a first light emitting device and a second light emitting device. The first light emitting device may be set to emit light when the first projecting image IMG1 is projected. The second light emitting device may be set to emit light when the second projecting image IMG2 is projected. Further, the first light emitting device and the second light emitting device may be set to emit different color lights, so that the left eye and the right eye of the user may see different colors respectively for determining whether the sequence of turning on the first shuttering unit 230 and the second shuttering unit 240 corresponds to the sequence of projecting the first projecting image IMG1 and the second projecting image IMG2.

When the sequence of turning on the first shuttering unit 230 and the second shuttering unit 240 does not correspond to the sequence of projecting the first projecting image IMG1 and the second projecting image IMG2, the user may perform adjustments by operating an input device 130. Here, the input device 130 is, for example, a keypad or a switch. The input device 130 may be disposed on the decoder 120 or the shutter glass 200 depending on design requirements. The input device 130 outputs a control signal $S_{SYN}$ when being operated. The control signal $S_{SYN}$ is optionally output to the decoder 120 (as shown by the solid line) or the shutter glass 200 (as shown by the dotted line).

When the decoder 120 receives the control signal $S_{SYN}$, the sequence for outputting the first image data PD1 and the second image data PD2 may then be adjusted (i.e. exchanged). That is, the sequence for projecting the first projecting image IMG1 and the second projecting image IMG2 is adjusted. Accordingly, the sequence for turning on the first shuttering unit 230 and the second shuttering unit 240 then corresponds to the sequence for projecting the first projecting image IMG1 and the second projecting image IMG2.

When the shutter glass 200 receives the control signal $S_{SYN}$, the sequence for turning on the first shuttering unit 230 and the second shuttering unit 240 may then be adjusted (i.e. exchanged). Accordingly, the sequence for turning on the first shuttering unit 230 and the second shuttering unit 240 then corresponds to the sequence for projecting the first projecting image IMG1 and the second projecting image IMG2.

In the embodiment, by adjusting the sequence of turning on the first shuttering unit 230 and the second shuttering unit 240, the projecting module 110 turns on a right eye shuttering unit and turns off a left eye shuttering unit when projecting the right eye image, and turns on the left eye shuttering unit and turns off the right eye shuttering unit when projecting the left eye image. In other words, the embodiment ensures the user to feel the correct 3D visual effect.

Figure 3:
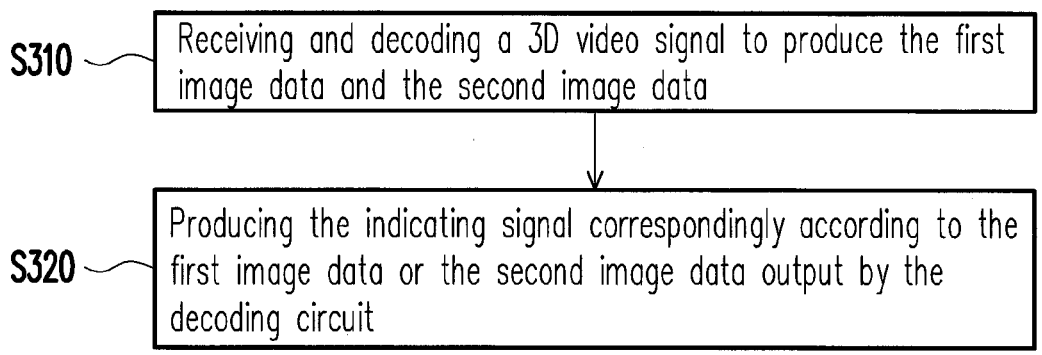
FIG. 3 illustrates a flow chart diagram of a method of processing an image of a projecting system according to an embodiment of the invention.

Accordingly, the method of processing an image applicable to a projecting system is summarized. Herein, the projecting system 100 includes the projecting module 110, the decoder 120, and the shutter glass 200. Referring to FIG. 3, in the embodiment, a 3D video signal is first received and decoded to produce a first image data and a second image data (step S310). Thereafter, an indicating unit produces an indicating signal correspondingly according to one of the first image data and the second image data output by a decoding circuit (step S320).

As aforementioned, the method for processing the image of the projecting system in the embodiment further includes the following. An image status signal is correspondingly produced depending on whether the first image data or the second image data is output. The image status signal is provided to the indicating unit to produce the indicating signal correspondingly. A projecting module in the projecting system is provided to output a frame turning control signal to a first shuttering unit and a second shutter unit in the projecting system. An image receiving operation of the first shuttering unit and an image receiving operation of the second shuttering unit are controlled by turning on or turning off the first shuttering unit and the second shuttering unit according to the frame turning control signal. The first shuttering unit and the second shuttering unit have contrary image receiving operations. An indicating signal is provided to indicate that the image receiving operations of the first shuttering unit and the second shuttering unit are turned on or turned off.

Figure 4:
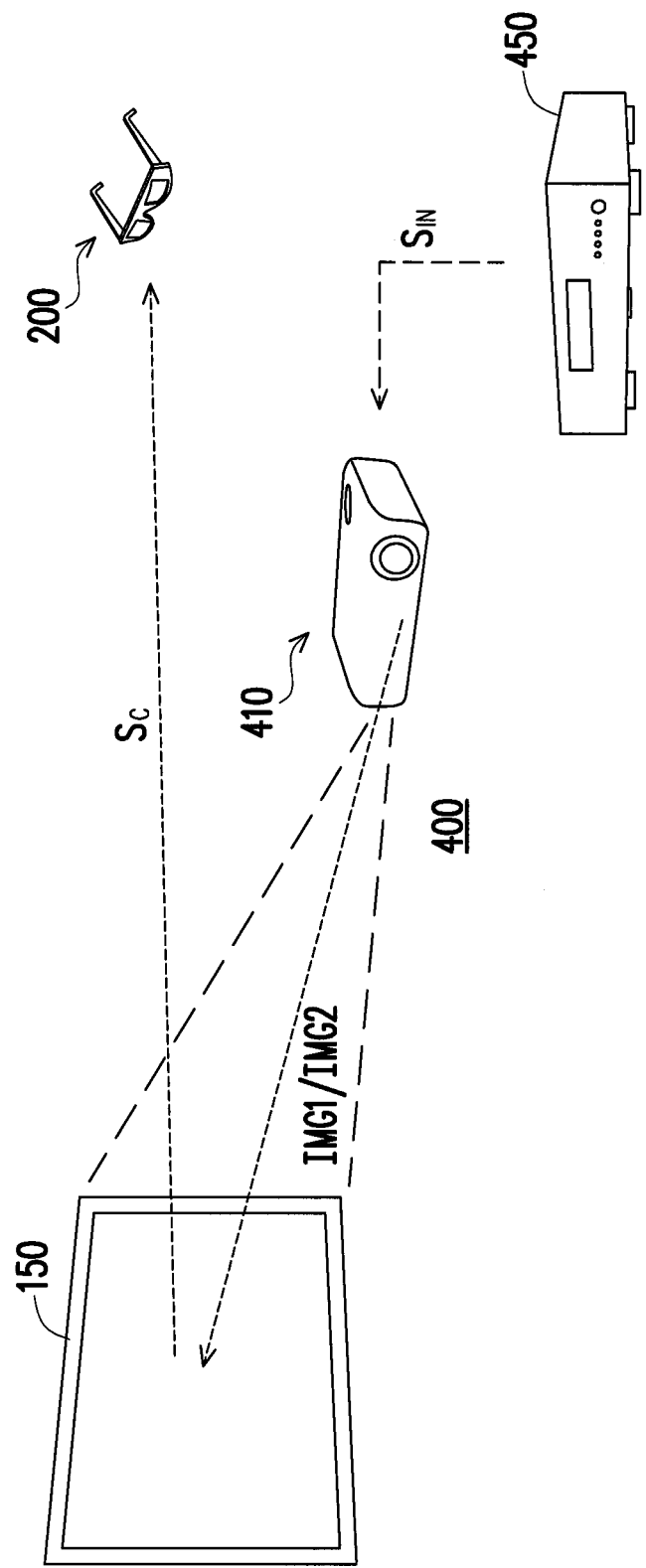
FIG. 4 depicts a schematic diagram of a projecting system according to an embodiment of the invention.

Referring to FIG. 4, in the embodiment, a projecting system 400 has a projecting module 410 and a shutter glass 200. Herein, a decoder and an input device are not illustrated in FIG. 4. The decoder may be optionally external (whatever plug-in or wireless communication) from or built-in in a projecting module 410. The input device may be optionally disposed on the decoder or the shutter glass 200. The projecting module 410 receives a 3D video signal $S_{IN}$ from a video source 450. The video source 450 is, for example, a Blu-ray player; however, the invention is not limited thereto. The elements with the same notations in the projecting system 400 and the projecting system 100 have similar functions and the details are thus omitted hereinafter.

In summary, the embodiments of the invention have at least one of the following advantages. In the embodiments of the invention, the indicating signal is produced correspondingly according to one of the first image data and the second image data output by decoding circuit in the decoder. As a result, the user may determine whether a sequence for projecting the first projecting image and the second projecting image and a sequence for turning on the first shuttering unit and the second shuttering unit are corresponding to each other through the indicating unit and the shutter glass. In the embodiments of the invention, when the sequence for projecting the first projecting image and the second projecting image is not corresponding to the sequence for turning on the first shuttering unit and the second shuttering unit, the user may perform some adjustments, so that the sequence for projecting the first projecting image and the second projecting image corresponds to the sequence for turning on the first shuttering unit and the second shuttering unit.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Moreover, these claims may refer to use "first", "second", etc. following with noun or element. Such terms should be understood as a nomenclature and should not be construed as giving the limitation on the number of the elements modified by such nomenclature unless specific number has been given.

What is claimed is:

1. A decoder, adapted for a projecting system, wherein the projecting system has a projecting module and a shutter glass, the projecting module outputs a frame turning control signal to the shutter glass, the decoder comprising:
 a decoding circuit, configured to receive and decode a three-dimensional video signal to produce a first image data and a second image data, and output the first image data and the second image data to the projecting module; and
 an indicating unit, coupled to the decoding circuit, and produces an indicating signal correspondingly when the decoding circuit outputs one of the first image data and the second image data, wherein the indicating signal produced by the indicating unit is transmitted to the shutter glass.

2. The decoder as claimed in claim 1, wherein the decoding circuit correspondingly produces an image status signal according to one of the first image data and the second image data output by the decoding circuit, and the indicating unit receives the image status signal to correspondingly produce the indicating signal.

3. The decoder as claimed in claim 1, wherein the indicating unit comprises a first light emitting element configured to emit light according to the image status signal when the decoding circuit outputs the first image data.

4. The decoder as claimed in claim 3, wherein the indicating unit further comprises a second light emitting element configured to emit light according to the image status signal when the decoding circuit outputs the second image data.

5. The decoder as claimed in claim 1, wherein the shutter glass comprises a first shuttering unit and a second shuttering unit, and an image receiving operation of the first shuttering unit and an image receiving operation of the second shuttering unit are contrary to each other, wherein the image receiving operations of the first shuttering unit and the second shuttering unit are controlled by turning on or turning off the first shuttering unit and the second shuttering unit according to the frame turning control signal.

6. The decoder as claimed in claim 5, wherein the indicating signal is configured to indicate that the image receiving operations of the first shuttering unit and the second shuttering unit are turned on or turned off.

7. A projecting system, comprising:
 a decoder, comprising:
  a decoding circuit, configured to receive and decode a three-dimensional video signal to produce a first image data and a second image data; and
  an indicating unit, coupled to the decoding circuit, and producing an indicating signal correspondingly when the decoding circuit outputs one of the first image data and the second image data;
 a projecting module, coupled to the decoder, and configured to receive the first image data and the second image data; and a shutter glass, configured to receive a frame turning control signal output by the projecting module, wherein the indicating signal produced by the indicating unit is transmitted to the shutter glass.

8. The projecting system as claimed in claim 7, wherein the decoding circuit correspondingly produces an image status signal according to one of the first image data and the second image data output by the decoding circuit, and the indicating unit receives the image status signal to correspondingly produce the indicating signal.

9. The projecting system as claimed in claim 7, wherein the indicating unit comprises a first light emitting element configured to emit light according to the image status signal when the decoding circuit outputs the first image data.

10. The projecting system as claimed in claim 9, wherein the indicating unit further comprises a second light emitting element configured to emit light according to the image status signal when the decoding circuit outputs the second image data.

11. The projecting system as claimed in claim 7, wherein the shutter glass comprises a first shuttering unit and a second shuttering unit, and an image receiving operation of the first shuttering unit and an image receiving operation of the second shuttering unit are contrary to each other, wherein the image receiving operations of the first shuttering unit and the second shuttering unit are controlled by turning on or turning off the first shuttering unit and the second shuttering unit according to the frame turning control signal.

12. The projecting system as claimed in claim 11, wherein the indicating signal is configured to indicate that the image receiving operations of the first shuttering unit and the second shuttering unit are turned on or turned off.

13. The projecting system as claimed in claim 7, wherein the projecting module receives the first image data to produce a first projecting image, the projecting module receives the second image data to produce a second projecting image, and the first shuttering unit and the second shuttering unit are configured to receive the first projecting image and the second projecting image respectively.

14. A method for processing an image of a projecting system, comprising:
    receiving and decoding a three-dimensional video signal to produce a first image data and a second image data, and transmitting the first image data and the second image data to a projecting module;
    producing an indicating signal by an indicating unit correspondingly according to one of the first image data and outputting the second image data by a decoding circuit; and
    receiving a frame turning control signal output by the projecting module through a shutter glass, wherein the indicating signal produced by the indicating unit is transmitted to the shutter glass.

15. The method for processing the image of the projecting system as claimed in claim 14, further comprising:
    producing an image status signal according to one of the first image data and outputting the second image data by the decoding circuit, and the indicating unit receiving the image status signal from the indicating unit to correspondingly produce the indicating signal.

16. The method for processing the image of the projecting system as claimed in claim 14, further comprising:
    outputting the frame turning control signal to a first shuttering unit and a second shuttering unit of the shutter glass of the projecting system, wherein an image receiving operation of the first shuttering unit and an image receiving operation of the second shuttering unit are contrary to each other, and the image receiving operations of the first shuttering unit and the second shuttering unit are controlled by turning on or turning off the first shuttering unit and the second shuttering unit according to the frame turning control signal.

17. The method for processing the image of the projecting system as claimed in claim 16, further comprising:
    indicating the image receiving operations of the first shuttering unit and the second shuttering unit to turn on or turn off.

* * * * *